(12) United States Patent
Alonzo et al.

(10) Patent No.: US 6,343,490 B1
(45) Date of Patent: *Feb. 5, 2002

(54) PROCESSING ENTAILING SOL-GEL FABRICATION OF SILICA GLASS

(75) Inventors: John C Alonzo, Somerset; Suhas Bhandarkar, Glen Gardner; Michael P Bohrer, Lebanon; David Wilfred Johnson, Jr., Bedminster, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,191

(22) Filed: Aug. 2, 1999

Related U.S. Application Data

(63) Continuation-in-part of application No. 08/971,460, filed on Nov. 17, 1997, which is a continuation of application No. 08/645,859, filed on May 14, 1996, now abandoned.

(51) Int. Cl.$^7$ .......................... C03B 37/016; C03B 8/02
(52) U.S. Cl. ........................... 65/395; 65/17.2; 516/81; 516/87
(58) Field of Search .................... 65/395, 17.2; 516/81, 516/87

(56) References Cited

U.S. PATENT DOCUMENTS

| | | | |
|---|---|---|---|
| 2,601,352 A | * | 6/1952 | Wolter |
| 2,741,600 A | * | 4/1956 | Allen ........................... 516/81 |
| 4,775,401 A | | 10/1988 | Fleming et al. |
| 5,116,535 A | | 5/1992 | Cochrane |
| 5,240,488 A | | 8/1993 | Chandross et al. |
| 5,246,624 A | | 9/1993 | Miller et al. |

FOREIGN PATENT DOCUMENTS

| | | |
|---|---|---|
| GB | 0300610 | 1/1989 |
| GB | 0807610 | 11/1997 |
| JP | 10-114511 | * 5/1998 |

OTHER PUBLICATIONS

Englis Abstract of Japan Pub. No. JP 10–114511A, May 6, 1998.*
MacChesney, J.B. et al., "Optical Fibers By A Hybrid Process Using Silica Overcladding Tubes" Journal of Non–Crystalline Solids, vol. 226, No. 3, pp. 233 (1998).
F. DiMarcello et al. "Fiber Drawing and Strength Properties," *Optical Fiber Communications*, vol. 1, Academic Press, Inc. p. 179–248 (1995).
R. Iler, *The Chemistry of Silica*, John Wiley & Sons, p. 42 (1979).

* cited by examiner

*Primary Examiner*—James Derrington
(74) *Attorney, Agent, or Firm*—Wendy W. Koba

(57) ABSTRACT

Silica sols exhibiting desirable yield-dilatancy are fabricated. A mixture comprising silica, water, and a pH-adjusting agent is provided, and the mixture is shear-mixed. The desirable properties of the resultant sol are attained by using a concentration of pH-adjusting agent that provides a viscosity within a particular range during shear mixing. The requisite pH range, however, changes depending on the properties of the silica mixture. A discovered technique for determining this changing pH range is by selecting the pH based on the silica surface area per unit volume of the mixture.

22 Claims, 3 Drawing Sheets

US 6,343,490 B1

PROCESSING ENTAILING SOL-GEL FABRICATION OF SILICA GLASS

This application is a continuation-in-part of U.S. patent application Ser. No. 08/971,460 filed Nov. 17, 1997, which is a continuation of U.S. patent application Ser. No. 08/645,859 filed May 14, 1996 now abandoned.

BACKGROUND OF THE INVENTION

1. Field of the Invention

The invention relates to sol-gel techniques for fabricating silica articles, in particular silica optical fiber.

2. Discussion of the Related Art

Silica optical fiber is produced from a glass preform, the preform typically consisting of a doped silica core surrounded by one or more claddings. As discussed in F. DiMarcello et al. "Fiber Drawing and Strength Properties," Optical Fiber Communications, Vol. 1, Academic Press, Inc., 1995, at 179–248, the preform is generally arranged vertically in a draw tower such that a portion of the preform is lowered into a furnace region that typically heats the preform to temperatures around 2200° C. The portion of the preform placed into the furnace region begins to soften, and the lower end of the preform forms what is known as the neck-down region, which is where the preform glass flows from the original cross-sectional area of the preform to the desired cross-sectional area of the fiber. From the lower tip of this neck-down region, the optical fiber is drawn.

One approach to preform manufacture involves the fabrication of an overcladding that surrounds an inner cladding and core. The overcladding does not have to meet some specifications as precisely as the core and inner cladding, and efforts to speed manufacture of preforms have therefore often focused on less expensive methods of forming the overcladding. One manner of forming the overcladding is the use of a sol-gel process. However, sol-gel methods have in the past tended to encounter cracking during the overcladding tube formation and subsequent drying process. Methods that suppressed such tendency included, for example, the use of supercritical drying and/or the use of drying control chemical additives (DCCA), both of which are relatively expensive and laborious. Other sol-gel processes have involved the precipitation of silica particles from solution. However, such precipitation processes typically involved the use of alkali silicates, and thus required further processing steps to remove the alkali metal ions.

Co-assigned U.S. Pat. No. 5,240,488 (the '488 patent), the disclosure of which is hereby incorporated by reference, discloses a sol-gel process capable of producing crack-free overcladding preform tubes of a kilogram or larger. In this process, a colloidal silica dispersion, e.g., fumed silica, is obtained having a pH of 2 to 4. To obtain adequate stability of the dispersion and prevent agglomeration, the pH is raised to a value of about 9 to about 14 by use of a base. Typically, a commercially-obtained dispersion is pre-stabilized at such a pH value by addition of a base such as tetramethylammonium hydroxide (TMAH). Introduction of the TMAH raises the pH value. Other quaternary ammonium hydroxides behave similarly. When the pH is so raised, the silica takes on a negative surface charge due to ionization of silanol groups present on the silica surface. The negative charge of the silica particles creates mutual repulsion, preventing substantial agglomeration and maintaining the stability of the dispersion.

At a later stage in the process, as discussed in Col. 15, lines 39–65 of the '488 patent, a gelling agent such as methyl formate is added to reduce the pH. The ester reacts to neutralize the base, and the negative character of the silica particles is thereby neutralized such that gelation is induced. Subsequent to gelation, the sol-gel body is typically released from its mold, and placed in an oven for drying and subsequent heat treatment, as reflected in the Table at Cols. 11–12 of the '488 patent.

There exist a variety of methods for producing a silica sol useful in such sol-gel processes. See, e.g., U.S. Pat. Nos. 5,116,535 and 5,246,624. Another approach is presented in co-assigned U.S. patent application Ser. No. 08/971,460 ("the '460 application"), the disclosure of which is hereby incorporated by reference. In the '460 application, the pH of a silica-water mixture is adjusted before or during mixing, resulting in destabilization of the mixture. Mixing within this unstable region provides a resultant sol with desirable stability.

While such processes generally provide useful results, improvements and refinements are continually sought.

SUMMARY OF THE INVENTION

The invention provides an improvement over current techniques for forming silica sols useful in optical fiber manufacture, including the technique of the '460 application. The invention involves preparation of a silica sol having a desirable yield-dilatancy, such that commercial use of the sols is made easier and more attractive. Yield-dilatancy is characterized by an abrupt rise in a sol's viscosity as shear rate increases, even to the point of gelation in some cases. Advantageously, therefore, sols exhibit this abrupt rise at high shear rates, i.e., the sols exhibit a high yield-dilatancy point. Use of sols having poor or unknown yield-dilatancy clearly introduces the danger of an abrupt viscosity rise during transport, e.g., pumping, through equipment in a fabrication plant, leading to clogging or similar problems that would cause a halt in production. Additionally, while those in the art have generally sought to move toward higher-loaded sols (e.g., at least 50 wt. % silica) to lower shrinkage and ease cracking in sol-gel bodies, it has been found that such higher-loaded sols tend to encounter more severe yield-dilatancy. This factor makes the invention even more significant for future commercial sol-gel processes.

According to the invention, silica sols exhibiting desirable yield-dilatancy are fabricated by the following process. A mixture comprising silica, water, and a pH-adjusting agent is provided, and the mixture is shear-mixed. Typically, at least a portion of the silica is added during the shear mixing, and, similarly, at least a portion of the pH-adjusting agent is typically added during or after the mixing. The desirable properties of the resultant sol are attained by using a concentration of pH-adjusting agent that moves the sol into a particular range of raised viscosity, and instability, during shear mixing.

The invention reflects the discovery, however, that the concentration of agent required to reach this range in fact changes depending on the properties of the silica mixture. And the invention further reflects a discovered technique for determining how to reach the raised viscosity range —by selecting the moles of pH-adjusting agent based on the silica surface area per unit volume of the mixture. The invention thus makes it possible to determine the appropriate concentration of pH-adjusting agent for varying types and amounts of silica. While previous techniques for fabricating silica sols may have been useful for the particular parameters disclosed therein, the invention makes it possible to produce high yield-dilatancy point sols for a variety of parameters, including higher-loaded sols.

DETAILED DESCRIPTION OF THE INVENTION

Figure 1:
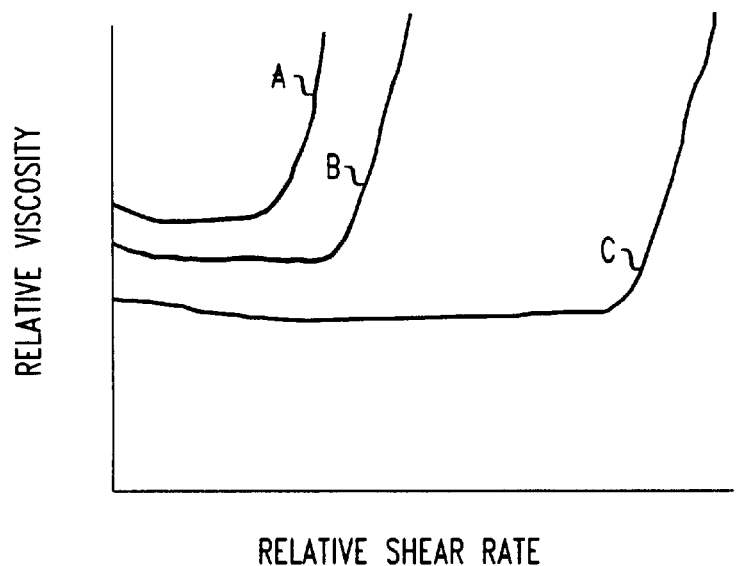
FIG. 1 illustrates yield-dilatancy characteristics of sols according to the invention.

The invention relates to a process for fabricating a silica article, e.g., optical fiber, involving formation of desirable yield-dilatancy silica sols. Yield-dilatancy is schematically shown in FIG. 1. Three silica sols—A, B, and C—are represented. As the sols encounter shear, e.g., when being pumped through equipment at a manufacturing plant, their viscosity tends to initially lower slightly, but then increases as the shear rate continues to increase. Sol A has the lowest yield-dilatancy point—exhibiting an abrupt increase in viscosity at a relatively low shear rate. Sol B has a bit higher yield-dilatancy point. Sol C, however, exhibits the properties of a sol according to the invention—the sol is able to endure relatively high shear rates without reaching the yield-dilatancy point. It is believed that at the yield-dilatancy point, the hydrodynamic forces overcome the electrostatic repulsion in the sol. Because poorly dispersed sol tends to be weakly repulsed or even flocculated, it takes less shear to overcome the repulsion. Advantageously, the dispersion of the invention exhibits a yield-dilatancy point of at least 30,000 sec$^{-1}$. Sols with lower yield-dilatancy points create the potential for problems when being pumped under typical conditions in a plant environment.

(Yield-dilatancy point indicates the wall shear rate at which a plot of viscosity in centipoise (y-axis) vs. wall shear rate in sec$^{-1}$ (x-axis) exhibits a slope of 0.1 or greater. The yield-dilatancy is measured by use of a capillary viscometer, which allows monitoring over a large range of shear rates, e.g., 1000 to 100,000 sec$^{-1}$. Specifically, the fluid to be measured is pumped through a capillary of known dimensions, and the pressure drop is monitored as flow rate is increased (for values presented herein, the shear rate is that measured at the wall of the capillary—i.e., the wall shear rate). The Hagen-Poiseuille law is used to calculate viscosity from flow rate, pressure drop, and capillary dimensions. For the sols of the invention, at low flow rates, the pressure drop tends to increase linearly with flow rate. But at the yield-dilatancy point, the pressure drop increases dramatically, e.g., jumping from <100 psi to >500 psi.)

To fabricate the silica sol, a mixture comprising silica, water, and a pH-adjusting agent is provided, and the mixture is shear-mixed. The concentration of pH-adjusting agent is selected to move the sol into a particular range of raised viscosity, and instability, during shear mixing. An advantage of the invention is that it is possible to determine the appropriate concentration based on the silica surface area per unit volume of the mixture. Details of the process are as follows.

The mixture contains water, typically deionized, a pH-adjusting agent, and silica. Other additives, such as surface-active agents, are also possible. Typically, the components are added individually. The silica is generally added gradually in powder form to the aqueous components after activation of the shear mixing apparatus. At least a portion of the pH-adjusting agent is typically added during or after the mixing, as well. Other techniques for adding the components are also possible.

The pH-adjusting agent is generally a base that raises the pH. Specifically, the pH of a silica-water mixture is generally around 4, yet the pH at the raised viscosity range at which shear mixing is performed is generally much higher. Useful agents include tetraalkylammonium hydroxides, such as tetramethylammonium hydroxide (TMAH) and tetraethylammonium hydroxide (TEAH), as well as ammonium hydroxide. Other bases are also possible.

The silica is generally added such that the final sol will contain about 50 to about 70 wt. % silica, advantageously at least 55 wt. % silica since higher loadings generally improve the drying properties of a sol-gel body. The surface area of the silica generally ranges from 35 to 200 m$^2$/g. Typically, the silica is fumed silica, but silica manufactured by other techniques is also capable of use. Desirably, the chlorine concentration is kept low, e.g., <10 ppm, as is normally provided in commercially-available silica. Guidelines for selecting the amounts of silica and pH-adjusting agent are discussed below.

Figure 2:
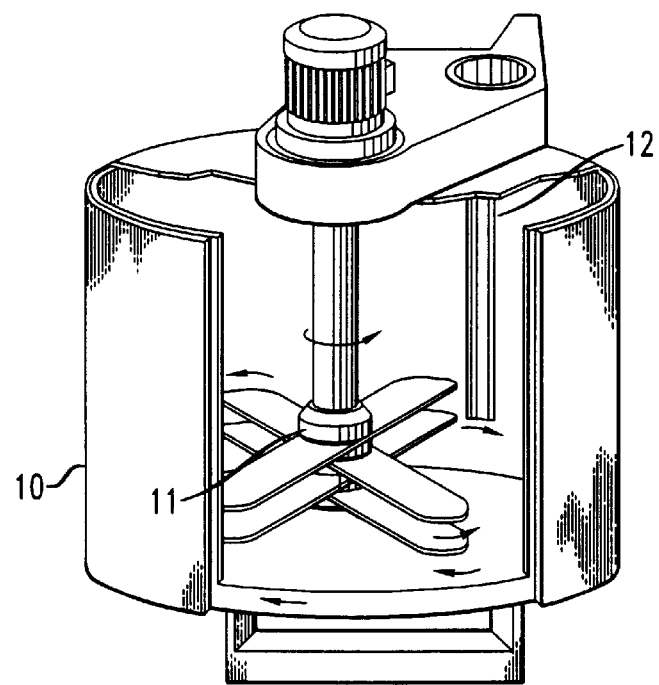
FIG. 2 illustrates a shear mixing apparatus useful in the invention.

As mentioned above, the shear mixing apparatus is generally activated before addition of most, if not all, of the silica powder, and then the silica powder is gradually added during the shear mixing. (Shear mixing, as known in the art, indicates imparting energy into a fluid by inducing high momentum flows in a viscous liquid, these flows providing relatively quick and efficient dispersion.) Any suitable shear mixing apparatus is used. A typical apparatus is illustrated in FIG. 2. The apparatus contains a drum 10, an agitating blade 11, and a rotating scraper 12. It is also possible for the drum 10 to revolve in the direction counter to that of the blade 11, while the scraper 12 remains stationary. For a mixture containing about 50 to about 70 wt. % silica, the viscosity during shear mixing is generally at least 1000 cp, advantageously 3000 to 5000 cp. Higher viscosities are possible in some cases, but have the potential to cause problems with the mixing apparatus. (The viscosity during and/or after mixing is typically measured by any conventional low shear rate technique, as opposed to the high shear rate technique of a capillary viscometer. Low shear rate technique indicates that shear rates of no more than 200 sec$^{-1}$ are used to obtain a viscosity measurement, and the resulting viscosity is referred to hereafter as low shear viscosity.)

Shear mixing is generally performed such that at least 0.5 hours of the mixing takes place at a low shear viscosity of at least 1000 cp. More typically, the shear mixing is performed such that at least 1 hour of the mixing takes place at a low shear viscosity of at least 1000 cp. More than 2 hours of shear mixing at the elevated viscosity is generally not required. As stated above, the viscosity during the shear mixing is advantageously 3000 to 5000 cp. The actual time of shear mixing at the elevated viscosity depends on a variety of considerations such as the size of the mixing apparatus, the rate of mixing, and the amount of mixture.

Because of these numerous factors, energy input is a useful parameter for characterizing the shear mixing, in that energy input takes into account several factors including viscosity and tip speed of the mixing apparatus. Generally, the shear mixing is performed at an energy input of at least 0.5 hp/gal (horsepower per gallon), typically 0.5 to 1.5 hp/gal, advantageously 0.75 to 1.0 hp/gal, again for a time period of at least 0.5 hours, advantageously at least 1 hour. (It is possible for portions of shear mixing to be performed at lower viscosities/lower energy inputs than the typical or advantageous ranges presented above. For example, according to the invention, it is possible that shear mixing could be performed for 45 minutes, yet with only 30 minutes performed at the elevated viscosity or desired energy input.)

After this shear mixing period, additional pH-adjusting agent is typically added, and mixing is continued for a short time, e.g., 5 to 30 minutes, sufficient to distribute the additional agent, and then mixing is ceased. The pH-adjusting agent, as mentioned above, is generally basic. The additional agent therefore generally raises the pH from the value at which the bulk of the shear mixing was performed, such that the resultant sol is stabilized in accordance with conventional sol processes. Generally, the added agent provides a pH of at least about 10.5. The stabilization also tends to induce a much-reduced viscosity after shear mixing, e.g., about 100 cp or less (again, as measured by a low shear rate technique). The resultant sol exhibits a desirably high yield-dilatancy point, and is capable of either storage or immediate use. (As used herein, the term "viscosity after shear mixing" indicates the viscosity at the completion of the mixing step, as opposed, for example, to an intermediate viscosity measured after a temporary halt in mixing.)

Figure 3:
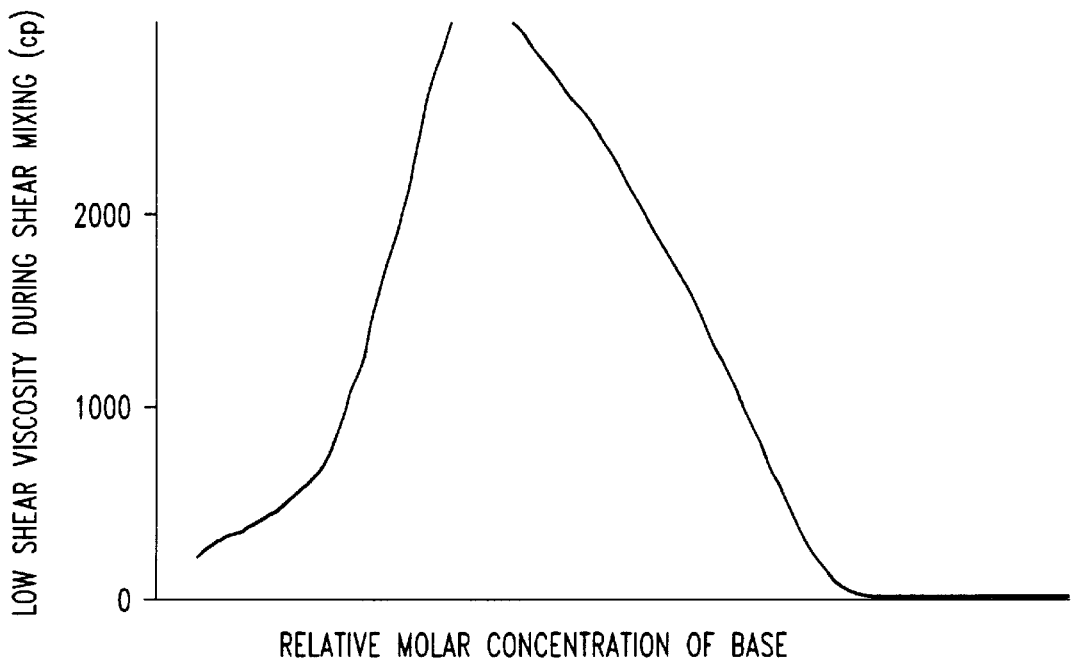
FIGS. 3A and 3B illustrate the relationship of pH-adjusting agent concentration and viscosity during and after shear mixing according to the invention.
Figure 3:
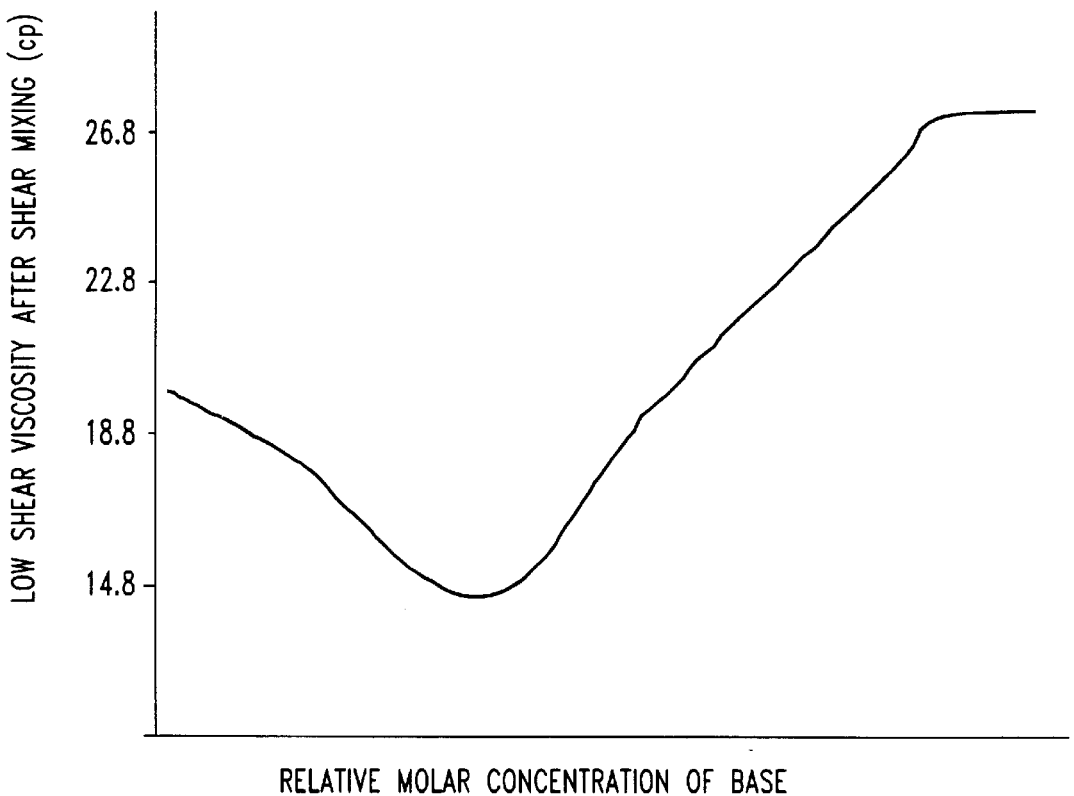

The parameters that provide a useful, high yield-dilatancy point sol are schematically illustrated in FIGS. 3A and 3B. Specifically, the shear mixing is performed at a pH-adjusting agent, e.g. a base, concentration that provides the elevated viscosity, as discussed above. This high-viscosity range is schematically illustrated by the curve of FIG. 3A. Mixing within this region, at which the silica mixture is viscous and unstable, provides desirable results, specifically high yield-dilatancy point, in the resultant sol. Advantageously, mixing is performed on the right, downward-sloping portion of this curve, which avoids the possibility of moving through the very high viscosity peak (not shown) of the curve during the mixing process. (In this small peak area, which is difficult to measure, it is possible to have very high spikes in viscosity, e.g., much greater than 5000 cp, which could potentially cause problems with the shear mixing apparatus.)

The desirable results are also reflected in the final viscosity. Specifically, mixtures that are shear mixed within this high-viscosity region shown in FIG. 3A tend to exhibit a very low viscosity after shear mixing is ceased, as reflected in FIG. 3B. (Note that FIG. 3A covers a much broader range of viscosity values than FIG. 3B.) In fact, according to the invention, sols that have relatively low final, low shear viscosities, e.g., below about 100 cp, advantageously below about 60 cp, tend to exhibit desirable yield-dilatancy. Advantageously, sols made according to the invention exhibit yield-dilatancy points of at least 30,000 sec$^{-1}$. It is also possible to attain even higher yield-dilatancy points, e.g., over 80,000 sec$^{-1}$. (The break in the peak reflected in FIG. 3A is similarly found, as a drop-off point, in FIG. 3B.)

Figure 5:
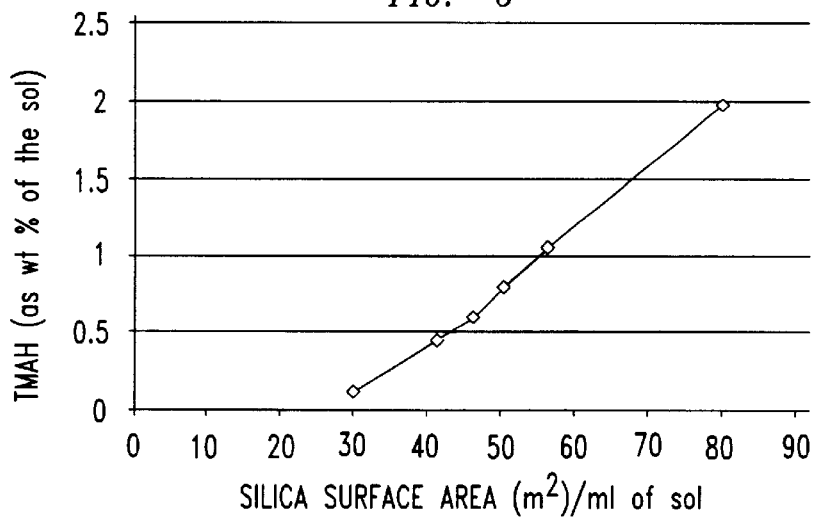
FIG. 5 illustrates selection of an appropriate concentration of pH-adjusting agent based on the ratio of silica surface area to mixture volume according to the invention.

It has been discovered that the particular viscous, unstable range which provides these desired properties is not fixed at particular pH values or pH-adjusting agent concentrations. Thus, the particular shapes and relative locations of the plots illustrated in FIGS. 3A and 3B are distinct for differing types of silica mixtures, e.g., different weight ratios and different silica surface areas. According to the invention, however, the pH-adjusting agent concentration that provides the desired yield-dilatancy is able to be determined for such varying silica mixtures by considering the silica surface area per unit volume of the mixture. Specifically, because bonds formed between particle surfaces appear to cause networking among particles, the surface area per unit volume becomes the primary determining factor in monitoring dispersion quality. Thus, for a given set of parameters, it is possible to generate a plot of surface area per unit volume vs. pH-adjusting agent concentration, such as shown in FIG. 5, the plot guiding selection of the appropriate agent concentration for a particular silica loading. Such a plot is easily generated by performing a series of experiments of the type reflected in Examples 1 through 4 for a particular process. Surface area per unit volume values useful in the invention include ratios of about 30 to about 90 m$^2$/ml.

Figure 4:
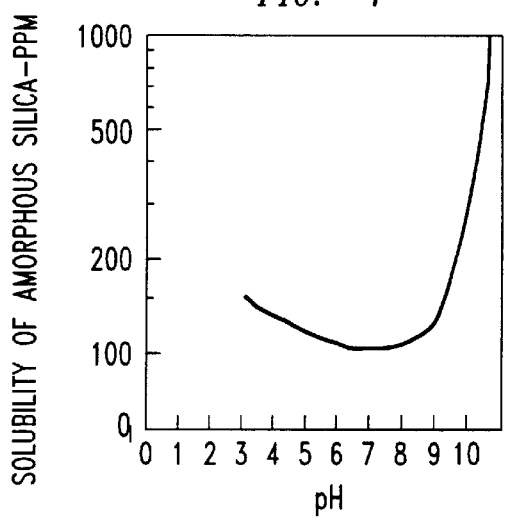
FIG. 4 illustrates the solubility of silica in a typical, stabilized silica dispersion.

Concentration of pH-adjusting agent is used instead of pH value due to solubility characteristics of the silica. FIG. 4 shows the solubility of silica in an aqueous solution stabilized by TMAH or a similar organic base, as a function of pH (see R. Iler, *The Chemistry of Silica*, John Wiley & Sons, 1979, p. 42). As the pH of the solution goes from about 10 to about 11, the solubility of silica in the solution substantially increases, e.g., from less than 10$^2$ ppm to greater than 10$^3$ ppm. Thus, as the pH increases, it is possible for more and more silica to enter the solution phase as a silicate (e.g., TMAH•2SiO$_2$ in the case of TMAH), which neutralizes part of the base, thereby rendering pH values an unreliable indicator of the amount of base added.

The silica sols are useful for fabricating a variety of articles, particular for photonics, e.g., optical fiber or planar waveguides. Specifically, for optical fiber fabrication, once the sol is formed, it is possible to form an overcladding tube, such as by the process disclosed in the '488 patent, discussed above. An optical fiber preform is then fabricated by forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD).

MCVD is discussed in co-assigned U.S. Pat. Nos. 4,217, 027; 4,262,035; and 4,909,816. MCVD involves passing a high-purity gas, e.g., a mixture of gases containing silicon and germanium, through the interior of a silica tube (known as the substrate tube) while heating the outside of the tube with a traversing oxy-hydrogen torch. (It is also possible to form a substrate tube using the sol of the invention.) In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform, as discussed in co-assigned U.S. Pat. No. 4,775,401.

Once the preform is formed, optical fiber is drawn as known in the art.

The invention will be further clarified by the following examples, which are intended to be exemplary.

EXAMPLE 1

Deionized water in an amount of 21.6 kg and 0.235 kg of TMAH were placed into a high shear disperser, such as illustrated in FIG. 2. High shear mixing was commenced at a tip speed of about 20 m/sec. Silica powder having a nominal surface area of 50 $m^2/g$, in an amount of 30 kg, was added gradually, over about 1 hour, after initiation of the shear mixing. When the powder addition was completed, the pH of the mixture was about 10. Mixing was performed for about 75 minutes, during which time the low-shear viscosity of the mixture was about 3200 cp. After this mixing period, an additional 0.72 kg of TMAH was added, without ceasing the mixing, and mixing was continued for about 10 additional minutes. The resultant sol exhibited a low-shear viscosity of about 25 cp, a pH of about 13, and a yield-dilatancy point well over 30,000 $sec^{-1}$.

The resultant sol exhibited a silica surface area per unit volume of about 41 $m^2/ml$, and the concentration of TMAH during mixing was 0.45 wt. %, at a silica loading of about 57 wt. %.

EXAMPLE 2

Using the same apparatus as Example 1, 6.6 kg of deionized water and 0.068 kg of TMAH were placed into the disperser. High shear mixing was commenced at a tip speed of about 20 m/sec. Fumed silica powder having a nominal surface area of 90 $m^2/g$, in an amount of 4.55 kg, was added gradually after initiation of the shear mixing. Mixing was performed for about 75 minutes, during which time the low-shear viscosity of the mixture was about 2200 cp. After this mixing period, an additional 0.1 kg of TMAH was added, without ceasing the mixing, and mixing was continued for about 15 additional minutes. The resultant sol exhibited a low-shear viscosity of about 42 cp, a pH of about 12, and a yield-dilatancy well over 30,000 $sec^{-1}$.

The resultant sol exhibited a silica surface area per unit volume of about 46 $m^2/ml$, and the concentration of TMAH during mixing was 0.6 wt. %, at a silica loading of about 40 wt. %.

EXAMPLE 3

Using the same apparatus as Example 1, 20.7 kg of deionized water and 0.52 kg of TMAH were placed into a the disperser. High shear mixing was commenced at a tip speed of about 20 m/sec. Fumed silica powder having a nominal surface area of about 50 $m^2/g$, in an amount of 40 kg, was added gradually after initiation of the shear mixing. When the powder addition was completed, the pH of the mixture was about 11.5. Mixing was performed for about 75 minutes, during which time the low-shear viscosity of the mixture was about 2000 cp. After this mixing period, an additional 0.6 kg of TMAH was added, without ceasing the mixing, and mixing was continued for about 15 additional minutes. The resultant sol exhibited a low-shear viscosity of about 70 cp, a pH of about 11.5, and a yield-dilatancy point well over 30,000 $sec^{-1}$.

The resultant sol exhibited a silica surface area per unit volume of about 50 $m^2/ml$, and the concentration of TMAH during mixing was 0.84 wt. % at a silica loading of 65 wt. %.

EXAMPLE 4

Using the same apparatus as Example 1, 2.5 kg of deionized water and 0.044 kg of TMAH were placed into a the disperser. High shear mixing was commenced at a tip speed of about 20 m/sec. Fumed silica powder having a nominal surface area of 130 $m^2/g$, in an amount of 1.5 kg, was added gradually after initiation of the shear mixing. Mixing was performed for about 75 minutes, during which time the low-shear viscosity of the mixture was about 2500 cp. After this mixing period, an additional 0.015 kg of TMAH was added, without ceasing the mixing, and mixing was continued for about 15 additional minutes. The resultant sol exhibited a low shear viscosity of about 40 cp, a pH of about 11.5, and a yield-dilatancy point well over 30,000 $sec^{-1}$.

The resultant sol exhibited a silica surface area per unit volume of about 56 $m^2/ml$, and the concentration of TMAH during mixing was 1.05 wt. %, at a silica loading of about 35 wt. %.

FIG. 5 shows a plot of total TMAH concentration vs. silica surface area per unit volume developed from data such as presented in Examples 1 through 4. From this relationship, it is possible to similarly produce silica sols exhibiting desirable properties, in particular high yield-dilatancy point.

COMPARATIVE EXAMPLE 5

A comparative sol was fabricated according to the following procedure.

Deionized water in an amount of 21.6 kg, 0.955 kg of TMAH, and 30 kg of silica powder having a nominal surface area of 50 $m^2/g$ were placed into a high shear disperser, such as illustrated in FIG. 2. The pH was about 13.4. High shear mixing was commenced at a tip speed of about 20 m/sec for about 75 minutes, during which the low-shear viscosity of the mixture was about 135 cp. After this mixing period, the resultant sol exhibited a low-shear viscosity of about 109 cp and a pH of about 13.2. The sol also exhibited a silica surface area per unit volume of about 41 $m^2/ml$, at a silica loading of about 57 wt. %.

Figure 6:
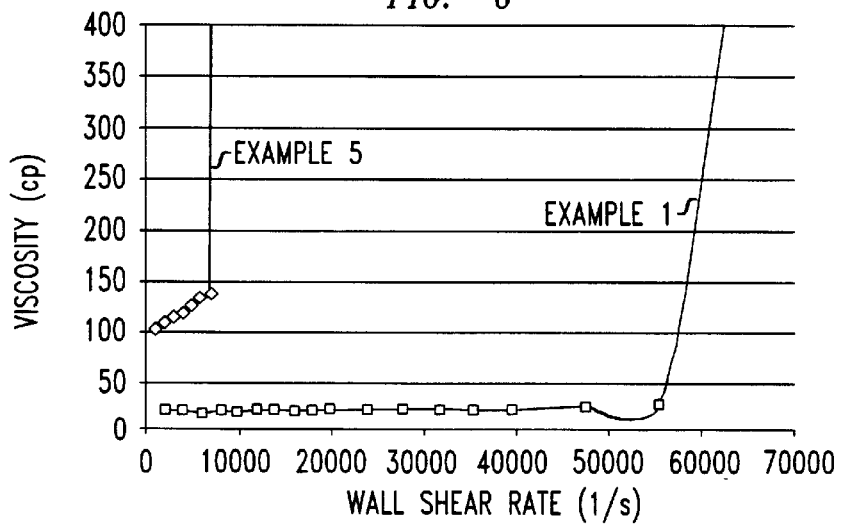
FIG. 6 illustrates the desirable yield-dilatancy of sols according to the invention, as compared to more undesirable sols.

As suggested by the low viscosity during shear mixing and by the high viscosity after mixing, the yield-dilatancy point was only about 9000 $s^{-1}$. The contrast between the sol made according to this Example 5 vs. the sol made according to the invention, as reflected in Example 1, is shown in FIG. 6. Specifically, FIG. 6 shows the poor yield-dilatancy behavior of the sol of Example 5, and the excellent yield-dilatancy behavior of the sol of Example 1 (>50,000 $s^{-1}$).

Other embodiments of the invention will be apparent to those skilled in the art from consideration of the specification and practice of the invention disclosed herein.

What is claimed is:

1. A process for making a silica sot, comprising the steps of:
    shear mixing water and a base pH-adjusting agent; preparing a mixture by adding silica gradually during the shear mixing; and
    shear mixing the mixture for a time period of at least 0.5 hours,
    wherein the base PH-adjusting agent is present in a concentration sufficient to raise the low shear viscosity of the mixture to at least 1000 cp during at least 0.5 hours of the time period.

2. The process of claim 1, wherein the concentration of the base PH-adjusting agent is selected according to the ratio of silica surface area to the volume of the mixture.

3. The process of claim 1, wherein a first portion of the base pH-adjusting agent is added to the water prior to the shear mixing and a second portion of the base PH-adjusting agent is added to the mixture during or after the shear mixing.

4. The process of claim 1, wherein the sol produced by the shear mixing exhibits a yield-dilatancy point of at least 30,000 sec$^{-1}$.

5. The process of claim 1, wherein the time period is at least one hour, and the low shear viscosity of the mixture is at least 1000 cp during at least one hour of the time period.

6. The process of claim 1, wherein the low shear viscosity during at least 0.5 hours of the time period is about 3000 to about 5000 cp.

7. The process of claim 3, wherein the low shear viscosity of the mixture after shear mixing is about 100 cp or less.

8. The process of claim 1, wherein the mixture, after shear mixing, comprises at least 50 wt. % silica.

9. The process of claim 1, wherein the silica surface area per unit volume of the mixture ranges from about 30 to about 90 m$^2$/ml.

10. The process of claim 1, wherein the base pH-adjusting agent is a tetraalkylammonium hydroxide.

11. The process of claim 10, wherein the base pH-adjusting agent is selected from tetramethylammonium hydroxide and tetraethylammonium hydroxide.

12. The process of claim 1, further comprising the steps of:
fabricating a preform overcladding tube from the mixture after shear mixing;
fabricating an optical fiber preform comprising the overcladding tube; and
drawing fiber from the preform.

13. A process for making a silica sol, comprising the steps of:
shear mixing water, and a base PH-adjusting agent; preparing a mixture by adding silica gradually during the shear mixing; and
shear mixing the mixture for a time period of at least 0.5 hours, the shear mixing being performed at an energy input of at least 0.5 hp/gal for at least 0.5 hours of the time period.

14. The process of claim 13, wherein the concentration of pH-adjusting agent is selected according to the silica surface area per unit volume of the mixture.

15. The process of claim 13, wherein the base pH-adjusting agent is selected from tetramethylammonium hydroxide and tetraethylammonium hydroxide.

16. The process of claim 13, where the energy input is 0.5 to 1.5 hp/gal.

17. The process of claim 13, wherein the low shear viscosity during at least 0.5 hours of the time period is about 3000 to about 5000 cp.

18. The process of claim 13, wherein the first portion of the base pH-adjusting agent is added to the water prior to the shear mixing and a second portion of the base pH-adjusting agent is added to the mixture during or after the shear mixing.

19. The process of claim 18, wherein the low shear viscosity of the mixture after shear mixing is about 100 cp or less.

20. The process of claim 13, wherein the resultant silica sol exhibits a yield-dilatancy point of at least 30,000 sec$^{-1}$.

21. The process of claim 13, further comprising the steps of:
fabricating a preform overcladding tube from the mixture after shear mixing;
fabricating an optical fiber preform comprising the overcladding tube; and
drawing fiber from the preform.

22. A process for making a silica sol, comprising the steps of:
shear mixing water, and a base pH-reducing agent; preparing a mixture by adding silica gradually during the shear mixing; and
shear mixing the mixture to provide a silica sol having a yield-dilatancy point of at least 30,000 sec$^{-1}$,
wherein the concentration of base pH-adjusting agent is selected according to the silica surface area per unit volume of the mixture.

* * * * *